Aug. 15, 1967 W. T. DALTON ET AL 3,335,677
PASTRY MACHINE
Filed Dec. 21, 1964 3 Sheets-Sheet 3
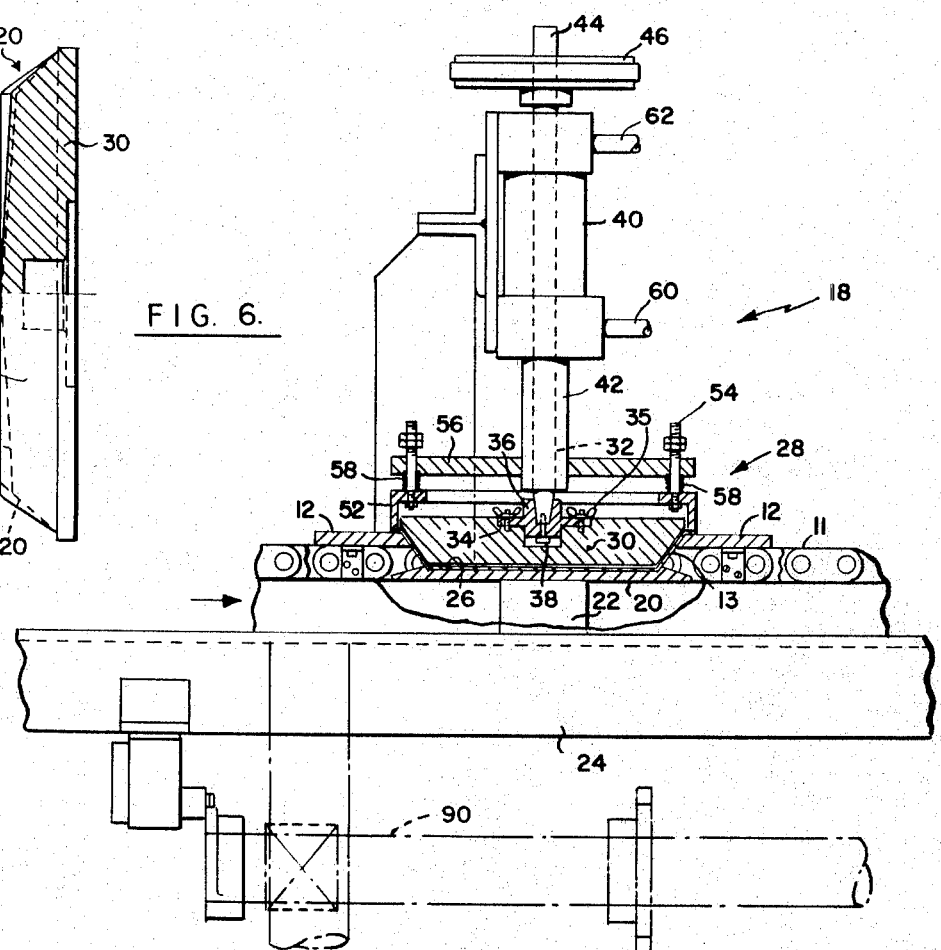
FIG. 6.
FIG. 3.
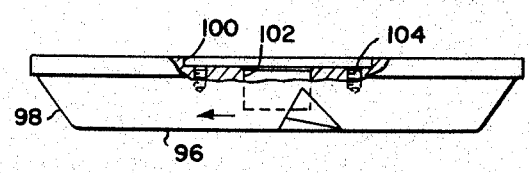
FIG. 5.
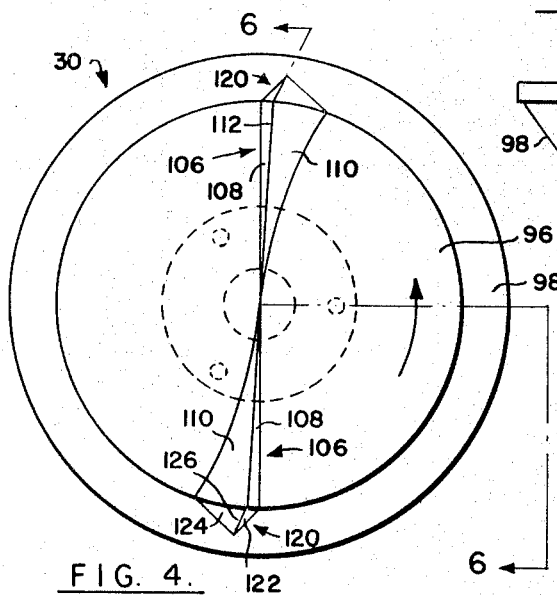
FIG. 4.
INVENTORS
WILLIAM T. DALTON &
JAMES K. CALDWELL
BY
Busser, Smith & Harding
ATTORNEYS United States Patent Office 3,335,677
Patented Aug. 15, 1967

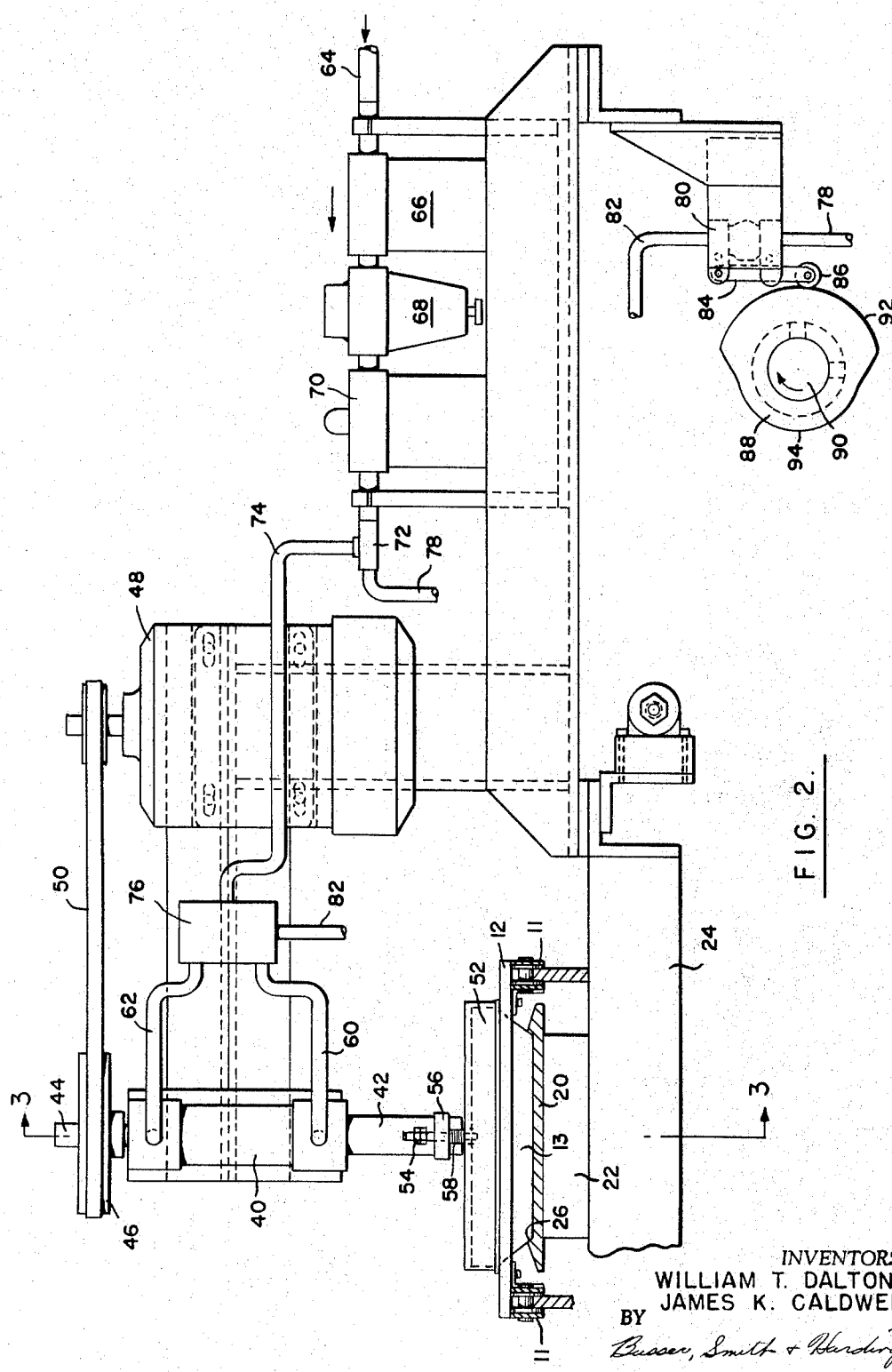

3,335,677
PASTRY MACHINE
William T. Dalton, Los Angeles, and James K. Caldwell, Whittier, Calif., assignors to The Everedy Machine Company, Inc., Philadelphia, Pa., a corporation of Pennsylvania
Filed Dec. 21, 1964, Ser. No. 419,685
3 Claims. (Cl. 107—15)

This invention relates generally to pastry machine and more particularly to a machine for making pie crusts.

Prior pie crust making machines have not been entirely satisfactory because they were unable to make a pie crust having a properly formed side brim, particularly when forming the pie crust of a granular material of the graham cracker type. The problem is that of providing a sufficient amount of material in the side brim and forming a properly shaped brim.

It is the general object of this invention to provide a pie crust former of the type for making pie crusts of granular material, such as graham cracker crumbs, which will form a pie crust of the proper shape and with sufficient material being provided in the side brim. Briefly stated, the machine in accordance with the invention comprises a spinner which is moved downwardly into a pie plate containing a metered charge of crust material. The spinner rotates as it is moved into the pie plate and has a groove formed in the bottom surface thereof which acts to force crumbs to the periphery of the pie plate and upwardly along the sides thereof to provide a crust having a well formed side and bottom.

The above and other objects and features of the invention will become apparent from the following description when read in connection with the accompanying drawings, in which:

FIGURE 2 is a side elevation of the pie crust forming mechanism in accordance with the invention;

Figure 1:
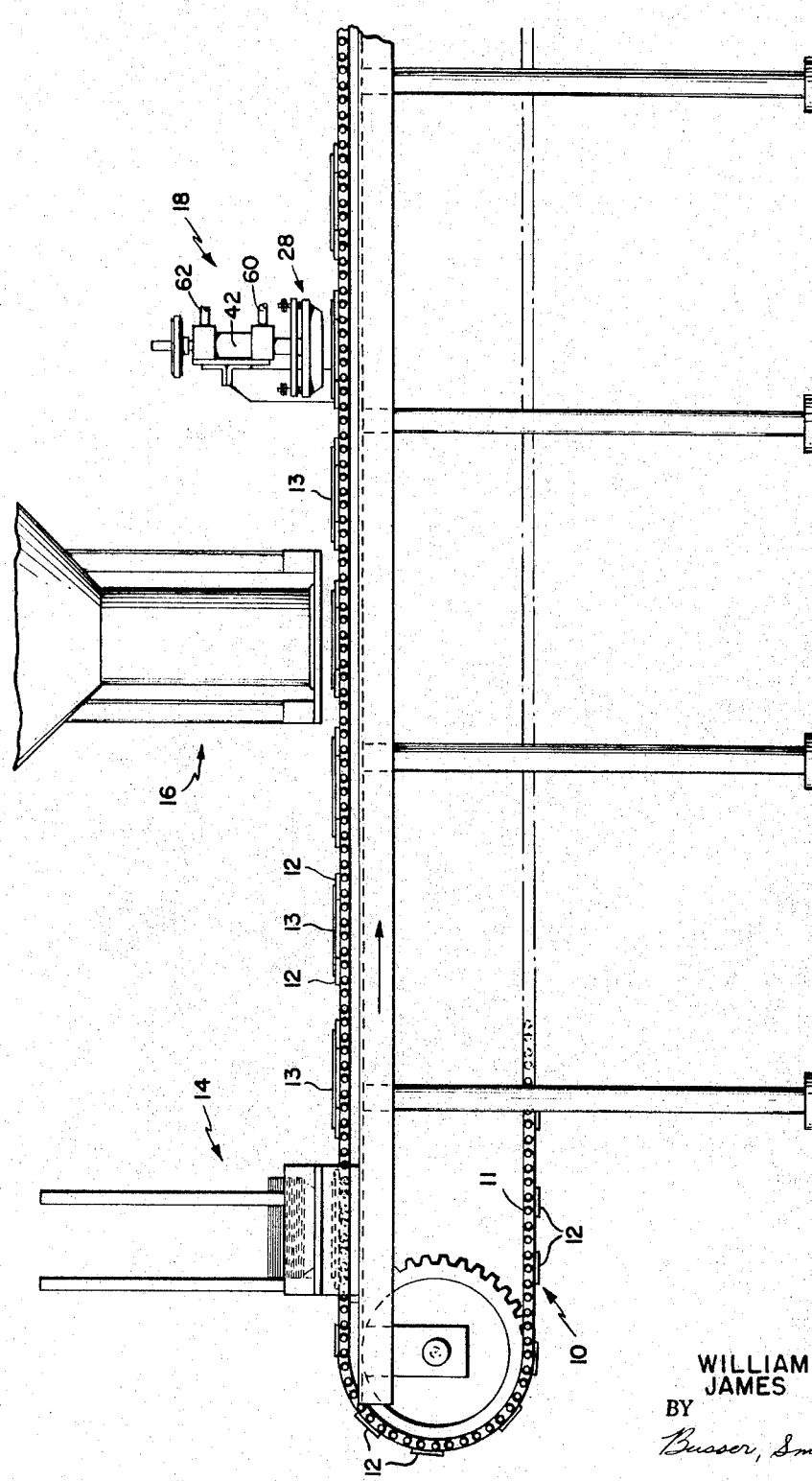
FIGURE 1 is a side elevation of a pastry machine in accordance with the invention.

FIGURE 3 is a view taken generally on lines 3—3 of FIGURE 2 with parts broken away to illustrate details of the spinner mechanism; and FIGURES 4, 5 and 6 are views illustrating a spinner used in the mechanism shown in FIGURES 2 and 3, FIGURE 6 being a view taken along lines 6—6 of FIGURE 4.

Referring to FIGURE 1, there is shown an endless conveyor 10 mounted on a suitable frame. The conveyor 10 is driven by a conventional drive means for effecting a step-like movement to index the same between successive positions in the direction indicated by the arrow in FIGURE 1. The conveyor 10 comprises a pair of spaced link belts 11 which carry pie plate supporting members 12 extending between and secured to the belts. Each pie plate 13 is supported by a pair of adjacent members 12 which have opposing arcuate edges conforming to the shape of the pie plate. As is best shown in FIGURE 3, the pie plates have an annular rim extending from the side brim thereof and adapted to rest on the support members 12. A conventional pie plate dispenser is indicated generally at 14 and serves to dispense a pie plate onto a pair of support members 12 for each indexing movement of the conveyor in accordance with conventional practice.

A conventional pie crust dispenser is indicated at 16 and serves to dispense a metered charge graham cracker type crumbs in granular form onto a pie plate positioned therebeneath. A pie crust former is indicated generally at 18 and serves to form the shape of the pie crust in the manner in accordance with this invention. After the pie crust has been formed, the pie plate containing such crust is moved to a station at which the contents of the pie are dispensed into the pie and the composition of the pie is completed. Since such pie filling means form no part of the present invention, description thereof will be omitted.

Referring now to FIGURES 2 and 3 wherein the pie crust former is shown in detail, there is provided at the pie crust forming station a centering plate 20 which is mounted on a bar 22 supported on the frame member 24 of the machine. Plate 20 is provided with a circular recess 26 in its upper end adapted to conform to the shape of the bottom of the pie plate 13. The edges of the plate 20 facing in the direction of the movement of the conveyor are tapered as is best shown in FIGURE 3. These tapered edges serve to guide a plate 13 carried by the conveyor on the members 12 into and from the centering recess 26 during movement of the conveyor. Accordingly, as the conveyor is indexed between its successive positions, the plate 20, in cooperation with the support members 12, insures that the pie plate 13 will be positioned in alignment with the center of the pie crust forming mechanism to be described hereafter.

The means for forming the pie crust comprises a forming head 28 including spinner 30 in the form of a pie-shaped disc. The spinner 30 is constructed to conform substantially to the shape of the interior of the pie plate 13 and to define when spaced slightly therefrom a spacing having a pie crust shape of uniform thickness.

Means are provided for mounting the spinner on the tapered end of a rotating shaft 32. To this end, there is provided a circular member 34 which is secured centrally on the top of the spinner 30 by means of a plurality of wing nuts 35. The member 34 comprises a cylindrical central portion 36 having a tapered bore adapted to receive the tapered end of the shaft 32. A cap screw 38 threadedly engages the end of the shaft 32 and is tightened to clamp the member 34 onto the end of the shaft 32.

Means are provided for actuating the spinner between the pie crust forming lower position thereof shown in FIGURES 2 and 3 and an upper position clearing the pie plate to permit movement thereof to a subsequent station. Such means comprises a conventional air cylinder 40, as for example, cylinder model No. M150 manufactured by the Alkon Products Corporation. The pneumatically operated cylinder 40 comprises a sleeve 42 through which the rotating shaft 32 extends, the sleeve being connected to the piston means of the cylinder 40 for vertical movement between the extended and retracted positions of the cylinder. There are provided suitable retaining rings (not shown) for providing for conjoint vertical movement of both the sleeve 42 and the shaft 32 while permitting rotation of the shaft within the sleeve. The upper end portion 44 of the shaft 32 has a non-circular shape and cooperates with an opening in a pulley 46 of similar shape whereby the shaft 32 is keyed to the pulley while permitting relative movement therebetween. Accordingly, axial movement of the shaft 32 to various positions will not disengage the pulley 46 from its driving relationship with the shaft. The pulley is driven by a motor 48 by way of a conventional belt and pulley arrangement indicated generally at 50.

Means are provided for holding the pie plate 13 stationary during the pie crust forming operation by the forming head 28. Such means comprises a retaining ring 52 which is mounted on a pair of pins 54 carried by a bar 56 clamped securely to the sleeve 42. A pair of springs 58 are positioned in compression between the bar 56 and the retaining ring 52 and bias the retaining ring 52 to the lower position thereof. The lower edge of the ring 52 is adapted to engage a peripheral annular rim of the pie plate 13 when the air cylinder 40 is moved to the lower position shown in FIGURES 2 and 3. This engagement occurs before the spinner 30 reaches the lower position at the end of the stroke of cylinder 40. It is noted that the parts are adjusted so that the annular rim of the pie plate 13 is clamped beween the lower edge of the retaining ring 52 and the support members 12 with the springs 58 providing the downward force on the retaining ring 52 to achieve the holding action.

The air for actuating the cylinder 40 between its operative positions is supplied thereto through the two conduits 60 and 62. When high pressure air is supplied to the cylinder through the lower conduit 60, the sleeve 42 and forming head carried thereby are moved from the extended lower position shown in FIGURE 3 to an upper retracted position. When high pressure air is supplied to the cylinder through the upper conduit 62, the sleeve 42 and the forming head 28 carried thereby are moved from the upper position downwardly to the position shown in FIGURE 3.

Suitable conventional pneumatic control means may be provided for actuating the air cylinder means between its operative positions. One form of such means is shown in FIGURE 2 wherein there is shown an air supply conduit 64 which is connected to a source of high pressure air and passes through an air filter 66, a pressure regulating valve 68 and a lubricator 70 to a T connection 72. One port of the T is connected by a conduit 74 to a conventional distributor valve control 76 which is connected to the conduits 60 and 62 passing from the air cylinder. The other end of the T is connected by a conduit 78 to one side of a pilot valve 80. The other side of the pilot valve 80 is connected by a conduit 82 to the distributor valve control 76. It will thus be apparent that by opening and closing the pilot valve 80, two different pressure conditions are applied to the distributor control 76, which in turn controls the supply of high pressure air to one or the other of the conduits 60, 62 for the air cylinder 40. More specifically, when the valve 80 is in the open position shown in the drawings, air is supplied through the distributor valve to the upper conduit 62 to effect movement of the sleeve 42 to the lower position. Conversely, when the pilot valve 80 is closed, air is supplied to the control valve to effect the supply of air to the lower conduit 60 to cause movement of the sleeve 42 to the upper position.

The pilot valve 80 is actuated between open and closed positions by a lever 84 pivoted at one end and carrying a cam follower roller 86 at the other end. The roller 86 rides on a cam 88 mounted on the cam shaft 90 of the machine, the cam shaft also controlling the indexing of the machine. The cam 88 is provided with a dwell portion 92 and a reduced diameter portion 94 each extending approximately over one-half of the circumference of the cam. By this arrangement, after the conveyor 10 has been moved through an indexing movement at which time it is rendered stationary, the cam 88 will be moved to a position in which the cam follower roller 86 rides on the dwell portion of the cam 88 to thereby move the lever 84 to open the valve 80. This causes a lowering of the crust forming head 28. Shortly before the next indexing movement of the conveyor 10, the reduced diameter portion 94 of the cam 88 will come in contact with the roller 86 to thereby position the lever 84 to close the valve 80. This causes a raising of the crust forming head 28.

Referring now to FIGURES 4, 5 and 6 which disclose the spinner 30 in detail, the spinner 30 has a generally disc shape and has a circular bottom 96 and a conical side brim 98 which are dimensioned to conform to the shape of the pie crust to be formed. The top side of the spinner 30 is provided with a pair of cylindrical recesses 100 and 102 adapted to receive the parts which secure the spinner 30 to the shaft 32, and with three tapped bores 104 threadedly engageable with the wing nuts 35.

The spinner bottom 96 is provided with a pair of grooves 106 which extend from the center of the spinner 30 to the side brim 98 generally along a diameter of the bottom. The direction of movement of the spinner is indicated by the arrows in FIGURES 4 and 5.

The bottom grooves 106 have the same shape and are generally angular in cross-section including a pair of walls 108 and 110 diverging from a common line 112 extending along a diameter of the bottom. As is best shown in FIGURE 6, the bottom grooves 106 are tapered, the depth increasing from the center to the circumference of the bottom. Referring to FIGURE 4, the leading edges of the walls 108 are straight and are formed along radii of the bottom and the trailing edges of walls 110 are arcuate. The leading and trailing edges converge at the center of the bottom 96 from spaced points at the circumference thereof. The walls 108 which lead in the direction of movement of the spinner have a steeper slope with respect to the bottom 96 than the walls 110 which are trailing.

The bottom grooves 106 join at the circumference with grooves 120 formed in the side brim 98. The side grooves 120 extend upwardly from the circumference of the bottom 96 and are also angular in cross-section. The side grooves 120 have leading and trailing walls 122 and 124 diverging from a common line 126 and extending from the corresponding parts of the bottom grooves 106 to a terminal point on the side brim 98. The leading edges of walls 122 are sloped rearwardly from the direction of movement of the spinner 30. As is best shown in FIGURE 6, the side grooves 120 are tapered from a deep point at the bottom circumference to the face of the side brim 98.

By this construction, as the rotating spinner 30 moves downwardly onto a charge of granular graham crackers in the pie plate 13, the crust material is forced toward the bottom of the pie plate to form the bottom of a crust, the spacing between the spinner bottom and the pie plate determining the thickness and the amount of compression of the crust. During this bottom forming, excess material passes into the bottom grooves 106 and by centrifugal action passes radially outwardly in the grooves 106 to the side grooves 120 and upwardly along the side grooves 120 to form the side brim of the pie crust.

While the preferred construction of the grooves disclosed above provides excellent results in forming pie crusts having sides of considerable height, it will be apparent that other forms of grooves may be used within the scope of the invention. For example, one groove may be sufficient for some applications or a groove having a generally spiral shape as it passes from the center of the bottom to the circumference thereof may be employed. Accordingly, it is not desired to be limited to the particular form of groove disclosed except as required by the claims set forth below.

In operation, when a pie plate 13 containing a metered charge of crust material is indexed to the position shown in FIGURE 2 with the pie plate 13 centered in the recess 26 of the centering plate 20, the air cylinder 40 is in its retracted position with the sleeve 42 and the parts carried thereby in their upper position. During the indexing movement, the cam follower 86 for the pilot valve 80 rides on the small diameter portion 94 of the cam 88. When the cam follower 86 rides up on the cam 88 to the large diameter portion 92, the pilot valve 80 is opened to effect a supply of air to the control means 76 which operates to deliver air through the conduit 62 to the air cylinder 40 to effect a downward movement of the crust forming head. The motor 48 which runs continuously maintains rotation of the spinner 30 during this movement. The spinner 30 is held in its forming position shown in the drawings during the dwell time of the cam 88. During this time, the pie crust is formed in the manner discussed above. When the cam follower 86 rides off the large diameter portion of the cam 88, the pilot valve 80 is moved to the closed position by the lever 84. With the pilot valve 80 in the closed position the air is delivered to the control means 76 to effect an air supply through the lower conduit to the air cylinder 40 to effect upward movement of the head 28. The conveyor 10 is then indexed another step to present a subsequent pie plate 13 beneath the crust forming mechanism 18.

It will be apparent that various changes and modifications may be made in the preferred embodiment of the invention disclosed above without departing from the scope of the invention wherefore it is not desired to be limited except as required by the following claims.

What is claimed is:

1. In a pastry machine, apparatus for forming a pie crust comprising a vertically extending shaft, means rotating said shaft, a spinner mounted on said shaft for rotation therewith and presenting a pie shaped wall facing downwardly, said wall having a circular bottom and a conical brim, means for positioning a pie plate having a side wall and a bottom and containing a charge of crust material in concentric alignment with said spinner, means moving said spinner from an upper position in which the spinner is spaced above the pie plate to a lower position in which said spinner extends within said pie plate to contact the crust material therein and form the pie crust, said spinner having a groove in the pie shaped wall thereof extending from a central location in said bottom to said conical brim for directing the crust material to the side wall of the pie plate during rotation of the spinner in contact with such material, the portion of said groove in said bottom being tapered to be progressively deeper towards the conical brim.

2. In a pastry machine, apparatus for forming a pie crust comprising a vertically extending shaft, means rotating said shaft, a spinner mounted on said shaft for rotation therewith and presenting a pie shaped wall facing downwardly, said wall having a flat circular bottom and a conical brim, means for positioning a pie plate having a side wall and a bottom and containing a charge of crust material in concentric alignment with said spinner, means moving said spinner from an upper position in which the spinner is spaced above the pie plate to a lower position in which said spinner extends within said pie plate to contact the crust material therein and form the pie crust, said spinner having a pair of radially extending narrow grooves in the pie shaped wall thereof, each groove lying on the same diameter of the spinner and extending from a central location to said conical brim for directing crust material to the side wall of the pie plate during rotation of the spinner in contact with such material.

3. In a pastry machine, apparatus for forming a pie crust comprising a vertically extending shaft, means rotating said shaft, a spinner mounted on said shaft for rotation therewith and presenting a pie shaped wall facing downwardly, said wall having a flat circular bottom and a conical brim, means for positioning a pie plate having a side wall and a bottom and containing a charge of crust material in concentric alignment with said spinner, means moving said spinner from an upper position in which the spinner is spaced above the pie plate to a lower position in which said spinner extends within said pie plate to contact the crust material therein and form the pie crust, said spinner having a groove in the pie shaped wall thereof extending from a central location in said bottom to said conical brim for directing crust material to the side wall of the pie plate during rotation of the spinner in contact with such material, said groove being angular in cross-section defining a pair of diverging walls, the wall of said pair which is leading in the direction of rotation of the spinner having a steeper slope with respect to said bottom than the trailing wall.

References Cited

UNITED STATES PATENTS 3,190,758 6/1965 Hauf _____ 107—54
3,203,368 8/1965 Cooper et al. _____ 107—54 X WALTER A. SCHEEL, *Primary Examiner.*

J. SHEA, *Assistant Examiner.*